United States Patent
Kanaev

(10) Patent No.: US 9,336,570 B2
(45) Date of Patent: May 10, 2016

(54) DEMOSAICKING SYSTEM AND METHOD FOR COLOR ARRAY BASED MULTI-SPECTRAL SENSORS

(71) Applicant: Andrey V. Kanaev, Lorton, VA (US)

(72) Inventor: Andrey V. Kanaev, Lorton, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/714,112

(22) Filed: May 15, 2015

(65) Prior Publication Data
US 2015/0332434 A1   Nov. 19, 2015

Related U.S. Application Data

(60) Provisional application No. 61/993,400, filed on May 15, 2014.

(51) Int. Cl.
*G06K 9/00* (2006.01)
*G06T 3/40* (2006.01)

(52) U.S. Cl.
CPC .......... *G06T 3/4061* (2013.01); *G06T 3/4015* (2013.01); *G06T 2207/10016* (2013.01); *G06T 2207/10024* (2013.01); *G06T 2207/30212* (2013.01)

(58) Field of Classification Search
None
See application file for complete search history.

(56) References Cited

U.S. PATENT DOCUMENTS

| | | | | |
|---|---|---|---|---|
| 7,242,478 B1* | 7/2007 | Dombrowski | ............ | G01J 3/02 356/419 |
| 7,706,609 B2* | 4/2010 | Bennett | .................... | H04N 1/58 382/162 |
| 8,934,034 B2* | 1/2015 | Nayar | ............... | H01L 27/14621 348/277 |
| 2006/0165179 A1* | 7/2006 | Feuer | ...................... | H04N 7/01 375/240.18 |
| 2011/0211099 A1* | 9/2011 | Nayar | ............... | H01L 27/14621 348/278 |
| 2011/0317916 A1* | 12/2011 | Zhang | .................. | G06T 3/4015 382/167 |
| 2012/0307116 A1* | 12/2012 | Lansel | ................. | G06T 3/4053 348/273 |

OTHER PUBLICATIONS

A. V. Kanaev1, M. K. Yetzbacher1, M. R. Kutterufl, M. J. DePrenger2, K. M. Novak2, C. A. Miller2, and T. V. Downes, "Super-Resolution Based Demosaicking for Full Motion Video SWIR Multi-Spectral Sensor" Imaging and Applied Optics 2014 OSA.*

(Continued)

*Primary Examiner* — Andrae S Allison
(74) *Attorney, Agent, or Firm* — US Naval Research Laboratory; Richard F. Bis

(57) ABSTRACT

A computer-implemented demosaicking system and method that can receive an image (or many images that represent individual frames of a video) at a demosaicking processor from a multi-spectral band camera. The image can include four or more band images that each correspond to an unique spectral band obtained by the multi-spectral band camera. A clustering module can perform spectral clustering of the four or more band images to identify multiple clusters. For each of the plurality of clusters, a weights module can determine a cluster weight by computing correlations between each of the unique spectral bands in each cluster. A super-resolution module can perform super-resolution for each of the unique spectral bands by utilizing the cluster weights from the weights module. The super-resolution module can iteratively apply the super-resolution for each of the unique spectral bands and a value for each unique spectral band can be updated after each iteration.

6 Claims, 4 Drawing Sheets

(56) References Cited

OTHER PUBLICATIONS

Kanaev et al, Compact full-motion video hyperspectral cameras: development, image processing, and applications, Proc. SPIE 9649, Electro-Optical Remote Sensing, Photonic Technologies, and Applications IX, 96490R (Oct. 16, 2015).*

Monno, Y.; Tanaka, M.; Okutomi, M., "Multispectral demosaicking using adaptive kernel upsampling," in Image Processing (ICIP), 2011 18th IEEE International Conference on , vol., no., pp. 3157-3160, Sep. 11-14, 2011.*

A. V. Kanaev and C. W. Miller, "Multi-frame super-resolution algorithm for complex motion patterns," Opt. Express 21, 19850-19866 (2013).*

Gaurav A. Baone ; Hairong Qi; Demosaicking methods for multispectral cameras using mosaic focal plane array technology. Proc. SPIE 6062, Spectral Imaging: Eighth International Symposium on Multispectral Color Science, 60620A (Jan. 15, 2006); doi:10.1117/12.642425.*

Sina Farsiu, Michael Elad, and Peyman Milanfar, Multiframe Demosaicing and Super-Resolution of Color Images, IEEE Transactions on Image Processing, vol. 15, No. 1, Jan. 2006 141.*

Bennet et al, Video and Image Bayesian Demosaicing with a Two Color Image Prior, ECCV 2006, Part I, LNCS 3951, pp. 508-521, 2006.*

* cited by examiner

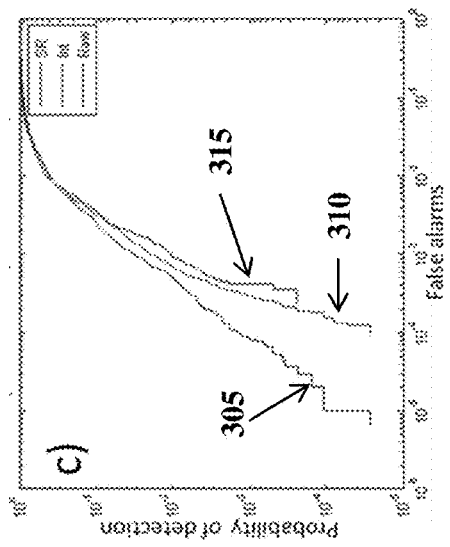
Figure 3C
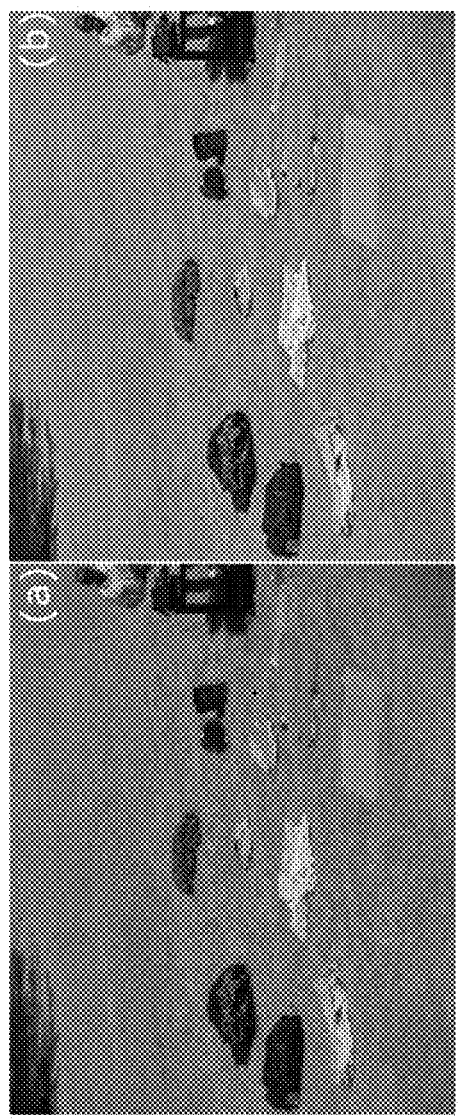
Figure 3B
Figure 3A

DEMOSAICKING SYSTEM AND METHOD FOR COLOR ARRAY BASED MULTI-SPECTRAL SENSORS

CROSS-REFERENCE TO RELATED APPLICATIONS

This application claims priority to provisional patent application entitled, "Demosaicking algorithm for color array based multi-spectral sensors," filed on May 15, 2014, and assigned U.S. Application No. 61/993,400; the entire contents of which are hereby incorporated by reference.

FIELD OF THE INVENTION

The present disclosure relates generally to increasing resolution, and more specifically relates to performing single-frame super-resolution based demosaicking of multi-spectral image frames.

BACKGROUND

Significant developments in mosaic filter technologies have paved the way to full motion video (FMV) mosaic-array multi-spectral cameras. The new class of multi- and hyper-spectral cameras opens broad possibilities of its utilization for military and industry purposes. Indeed, such cameras are able to classify materials as well as detect and track spectral signatures continuously in real time while simultaneously providing an operator the benefit of enhanced-discrimination-color video. Supporting these extensive capabilities requires significant back-end computational processing of the collected spectral data. In general, two processing streams are envisioned for mosaic array cameras. The first is spectral computation that provides essential spectral content analysis, e.g. detection or classification. The second is presentation of the video to an operator that can offer the best display of the content depending on the performed task, e.g. providing spatial resolution enhancement or color-coding of the spectral analysis. These processing streams can be executed in parallel or they can utilize each other's results. The spectral analysis algorithms have been developed extensively, however spatio-spectral processing of more than three equally-sampled spectral bands has been explored scarcely.

Mosaic-array cameras can have sensors with multiple short wave infrared (SWIR), or visible, bands of spectral resolution while requiring no custom optics. For example, sensors with at least 4, 9, 16, and 25 bands have been realized. The sensor can be composed of an array of pixel-sized filters fixed to a 2D staring focal plane array (FPA). In a 9-band sensor, the filter array can be composed of a repeating pattern of 3×3 unit cells, and each unit cell can contain a band-pass filters as well as short- or long-pass filters.

This type of sensor design can allow regaining some spatial resolution of the spectral bands when PSF size of the optics is order of the size of a single spectral pixel. Until now, the majority of the demosaicking processes has been developed for three-color Bayer color filter arrays; and, therefore, has provided spatial upsampling exclusively to RGB spectral bands with assumed strict relationship between them. Expansion of the techniques into multiple spectral bands has been attempted but with severely limiting assumptions. For example, in one technique, demosaicking is considered without spatial correlation of the spectral bands and is therefore substituted by standard image restoration using information from all available bands. In another technique, spatial correlation is utilized between the pixels, but critically relies on higher comparative resolution of one of the bands.

On the other hand, spatial correlation between adjacent pixels has been a driving force behind well-established multi-frame super-resolution. Additionally, super-resolution of hyperspectral images has been proposed. However, all hyperspectral super-resolution approaches in the prior art have to assume some type of spectral expansion and representation of hyperspectral data. For example, one hyperspectral super-resolution approach is Principal Component Analysis (PCA), but it is unattainable for multi-spectral data.

Accordingly, there remains a need in the art for a method for single-frame super-resolution based demosaicking of a multi-spectral single video frame.

SUMMARY OF THE INVENTION

According to one aspect of the invention, a demosaicking system is described that includes a demosaicking processor that can receive an image (or many images that represent individual frames of a video) from a multi-spectral band camera. The image can include four or more band images that each correspond to a unique spectral band obtained by the multi-spectral band camera. A clustering module can perform spectral clustering of the four or more band images to identify multiple clusters. For each of the plurality of clusters, a weights module can determine a cluster weight by computing correlations between each of the unique spectral bands in each cluster. A super-resolution module can perform super-resolution for each of the unique spectral bands by utilizing the cluster weights from the weights module. The super-resolution module can iteratively apply the super-resolution for each of the unique spectral bands and a value for each unique spectral band can be updated after each iteration.

According to another aspect of the invention, a demosaicking method is described for receiving an image at a demosaicking processor, wherein the image comprises four or more band images that each correspond to a unique spectral band obtained by a multi-spectral band camera. Next, spectral clustering of the four or more band images can be performed to identify a plurality of clusters with a clustering module, wherein the clustering module is implemented in a computer system that comprises instructions stored in a machine-readable medium and a processor that executes the instructions. For each of the plurality of clusters, a cluster weight can be determined by computing correlations between each of the unique spectral bands in each cluster with a weights module, wherein the weights module is implemented in a computer system that comprises instructions stored in a machine-readable medium and a processor that executes the instructions. Finally, super-resolution can be performed for each of the unique spectral bands by utilizing the cluster weights from the weights module with a super-resolution module, wherein the super-resolution module is implemented in a computer system that comprises instructions stored in a machine-readable medium and a processor that executes the instructions. Super-resolution can be applied iteratively for each of the unique spectral bands and a value for each unique spectral band is updated after each iteration.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIG. 3A is a single spectral band image as collected with 9-band mosaic-array camera.

FIG. 3B is a single spectral band image obtained with demosaicking process, in accordance with an exemplary embodiment of the invention.

FIG. 3C is a chart of ROCs for RX anomaly detection algorithm using demosaicked, interpolated, and raw spectral bands.

DETAILED DESCRIPTION OF EXEMPLARY EMBODIMENTS

Figure 1:
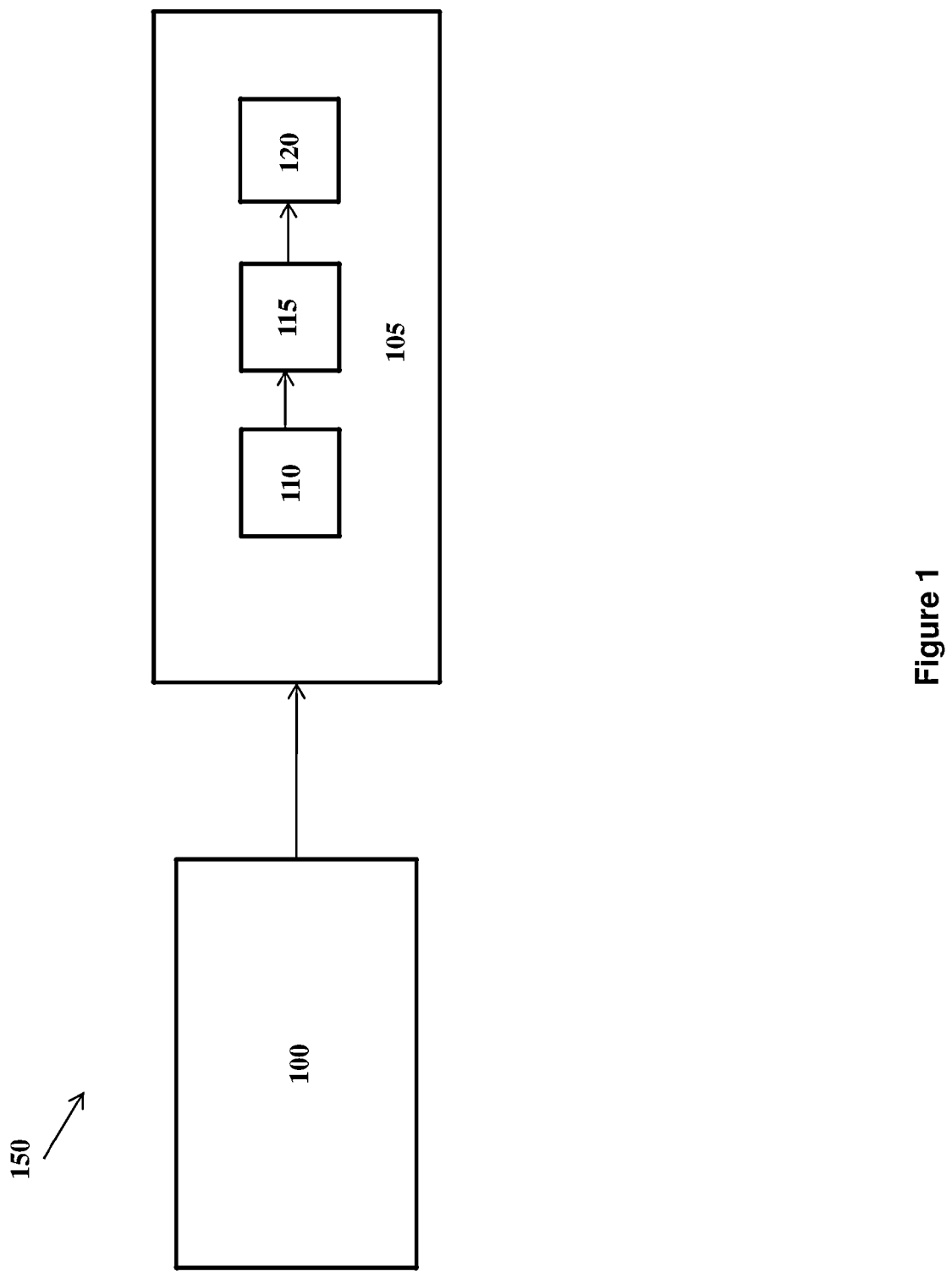
FIG. 1 is a block diagram of a demosaicking processor system, in accordance with an exemplary embodiment of the invention.

One or more embodiments or implementations are hereinafter described in conjunction with the drawings, where like reference numerals refer to like elements throughout, and where the various features are not necessarily drawn to scale.

In general, and according to one aspect of the invention, a method and system are described for multi-frame super-resolution based demosaicking of a multi-spectral single video frame. Within the standard multi-frame super-resolution framework, this approach can consider each band as an equivalent of a frame to be upsampled to full FPA resolution. Thus, the demosaicking process can utilize the fact that each band is one high-resolution pixel shifted version of its neighbors. The super-resolution reconstruction can be augmented by the weights, which can be determined by local correlation of the spectral bands. Overall, the method and algorithm can enhance imagery resolution while preserving most of the spectral information.

Super-resolution reconstruction is an inverse problem, the goal of which is to recreate a higher resolution image from a sequence of low resolution images. The inversion is performed with respect to the camera image formation process. This process can be modeled in system matrix notation as, $$I_L^n = DBW_n I_H + e_n, n=1 \ldots N, \quad (1)$$

where $\{I_L\}_{n=1}^N$ is the set of low resolution images, $I_H$ is the reconstructed high resolution image of a reference frame, D is a down sampling operator, B is a blurring matrix, $W_n$ is the warping matrix, and $e_n$ is a Gaussian noise vector. The process can consist of the steps that given a reference spectral band transform the rest of the spectral bands into low resolution images $I_L$ to cast demosaicking problem into the equation (1) form. Then functional minimization problem corresponding to inversion of equation (1) can be solved with weights preserving original image spectra.

The standard super-resolution problem considers the frames that are collected at the same wavelength or panchromatically. In this case, previously developed super-resolution processing can be used to increase the resolution of each frame. Then, the inversion of equation (1) can be performed iteratively, $$I_H^{(i+1)} = I_H^{(i)} + \Delta t \sum_{m=1}^M W_m BD^T U_m (I_L^m - DBW_m I_H^{(i)}) + \lambda \frac{\partial R(\nabla I_H)}{\partial I_H}, \quad (2)$$

where i denotes the iteration number; $\mathcal{R}$ and $\lambda$ are the regularization term and its weight respectively; operator $D^T$ indicates upsampling without interpolation $U_m$ are the weights reflecting the confidence of motion estimation. In the demosaicking problem each frame $\{I_L\}_{n=1}^N$ (where typically N=4, 9, 16, 25) represents an image collected at a different wavelength therefore equation (1) cannot be applied straightforwardly. Thus, demosaicking requires additional equations that describe the relationship between the bands to maintain the spectral content of the observed scene. On the other hand, confidence weights $U_m$ are equal to unity since exact shifts between the spectral bands are known. Then the weights U can be reintroduced in a different way to maintain spectral content by defining relationships between pairs of different spectral images n and k, $$U_{n,k}(x,y) = \exp\{-(C_{n,k}(x,y)-1)^2/a\} n,k=1 \ldots N \quad (3)$$

where $C_{n,k}$ is the correlation between bands n and k and a is the band affinity parameter responsible for normalization. To emphasize the local nature of the relationship between the bands, the weights $U_{n,k}$ can be defined on spectral clusters. Spectral clustering of data can be performed using the k-means technique with a preset number of clusters. However, any spectral classifier can be suitable for this task.

In an exemplary embodiment of the invention, and to more specifically describe the demosaicking system and process, the process can include the following steps. FIG. 1 is a block diagram of a demosaicking processor system 150, in accordance with an exemplary embodiment of the invention. First, a multi-spectral mosaic-array camera 100, or multi-spectral band camera, can take full motion video that includes multiple video frames. As one of ordinary skill in the art will understand, a video can contain multiple frames; therefore, each frame can essentially be treated as an individual image for processing purposes. Furthermore, as described above, multi-spectral band camera 100 can have multiple spectral bands. For example, in accordance with an exemplary embodiment of the invention, the multi-spectral band camera 100 can have four or more spectral bands; therefore, corresponding to four or more band images.

Therefore, each frame, treated as an individual image, can have multiple band images where each of the multiple band images can correspond to a unique spectral band obtained by the camera 100. For example, for a nine-sensor multi-spectral mosaic-array camera that takes a video that has 3 frames, each frame will have 9 band images that correspond to an unique spectral band obtained by the camera 100 for total of 27 band images. Additionally, one of ordinary skill in the art will understand that the multi-spectral band camera 100 can take a single image, instead of full motion video, and the image will be broken out into multiple band images depending on the number of spectral filters in the camera.

The collection of band images corresponding to the video frames and/or single images can then be sent to a demosaicking processor 105, which receives the images to process. For full motion video with multiple frames, the demosaicking processor 105 can process the band images of each frame separately before recombining the processed frames at the end of the processing steps. First, a clustering module 110 in the demosaicking processor 105 can perform spectral clustering of the four or more band images to identify a plurality of clusters. For example, the clustering module 110 can perform k-means clustering on the full spectral data (i.e. the multiple band images corresponding to an individual frame or single image). One of ordinary skill in the art will understand that this is only one example of a clustering approach, and other clustering techniques can be utilized.

Secondly, for each of the plurality of clusters identified by the clustering module 110, a weights module 115 of the demosaicking processor 105 can determine a cluster weight of each band for a given cluster by computing correlations between each of the unique spectral bands in each cluster. That is, the weights module 115 can determine minimization weights by computing 2D correlations between the spectral bands for each cluster. For example, if five clusters (i.e., 1, 2, 3, 4, and 5) are identified by the clustering module, the weights module can determine the weights between clusters 1 and 2, 1 and 3, 1 and 4, 1 and 5, 2 and 3, 2 and 4, 2 and 5, 3 and 4, 3 and 5, and 4 and 5.

Finally, the demosaicking process can formulate minimization problem corresponding to the inversion of analog of equation (1), in which $\{I_L\}_{n=1}^N$ is the set of spectral bands and $W_n$ are trivial pixel shifting matrixes, $$\min\{E(I_H)\} = \min_{I_H}\{\Sigma_{n=1}^N \|DBw_n I_H - I_L^n\|_{L2}^\sigma + \lambda R(\nabla I_H)\}, \quad (4)$$

where $\lambda$ is a regularization weight, $\sigma$ denotes weighted norm, in which the weights are function of the correlations computed in the second step of the process, and R is a smoothness term. In the last step of the demosaicking process, a super-resolution module 120 can solve equation (4) using a steepest descent approach, as known to one of ordinary skill in the art $$I_H^{n,(i+1)} = I_H^{n,(i)} + \Delta t \sum_{k=1}^N W_n B D^T U_{n,k}(I_L^k - DB W_n I_H^{k,(i)}) + \lambda \frac{\partial R(\nabla I_H^{n,i})}{\partial I_H^{n,i}}, \quad (5)$$

$$n = 1 \ldots N,$$

where equation (5) is analogous to equation (2) and is now written for each spectral band $I_H^n$ of high-resolution image $I_H$ explicitly. More specifically, the super-resolution module 120 can be configured to perform super-resolution for each of the unique spectral bands utilizing the cluster weights from the weights module 115. Furthermore, the super-resolution module 120 can be configured to apply super-resolution iteratively for each of the unique spectral bands and a value for each unique spectral band can be updated after each iteration. That is, the super-resolution module 120 can repeat for each spectral band and update other spectral bands after each iteration, until desired resolution improvement is achieved.

After the demosaicking process is completed, multiple frames in different colors remain (i.e., more than usual three Red-Green-Blue because it is multi-spectral). One of ordinary skill in the art will understand that the display of the colors can be performed in different ways.

In a testing environment, the demosaicking process has been applied to the data collected with a 9-band SWIR full motion video sensor during a roof top test. Example mosaic-array camera consists of color filter array that contains repeating pattern of 3×3 unit cells and that is superimposed onto 640×512 pixel size FPA with a pitch of 25 μm. Each unit cell contains 8 band-pass filters and 1 short-pass filter. The approximate center wavelengths of the filters are: 999 nm, 1111 nm, 1431 nm, 1240 nm, 1512 nm, 1054 nm, 1601 nm, short-pass cut off at about 920 nm, and 1192 nm. The processing results are demonstrated using imagery collected by the 9-band sensor equipped with f/4 200 mm optics. Nonuniformity correction can be applied to all data before performing the image processing operations. The imaged scenes consisted of a parking lot and a target set on natural background. RGB representation of 9-band data is attained by summing three spectral bands with consecutive wavelengths (i.e. the first color is the sum of: short-pass cut off at 920 nm, 999 nm, 1054 nm; the second color is the sum of: 1111 nm, 1192 nm, 1240 nm; the third color is the sum of: 1431 nm, 1512 nm, 1601 nm) to obtain an individual color (i.e. Red, Green, and Blue).

Figure 2B:
FIG. 2B is a RGB representation of nine bands obtained with demosaicking process, in accordance with an exemplary embodiment in the invention.
Figure 2A:
FIG. 2A is a false color RGB representation of nine bands pixel-stacked data as collected with 9-band mosaic-array camera.

FIG. 2A is a RGB representation of nine band pixel-stacked data as collected with 9-band mosaic-array camera. FIG. 2B is a RGB representation of nine bands obtained with demosaicking process, in accordance with an exemplary embodiment in the invention.

Visual comparison of the trivially stacked color pixels image versus demosaicked image, obtained in accordance with an exemplary embodiment in the invention images reveals significant spatial resolution improvement in the latter. Specifically, a significant difference between the demosaicking process and the conventional process is the edge color uniformity of the demosaicked image. For example, one can observe painted parking lines on the pavement in the center of FIG. 2A and FIG. 2B or specular reflections of sunlight from the parked cars. The abnormal spectral signatures observed at the edges in FIG. 2A occur because neighboring pixels at the edges may not sample the same materials; these artifacts interfere with spectral detection. FIG. 3A shows single spectral-band image collected with 9-band camera. In comparison, FIG. 3B demonstrates the result of a demosaicking process, in accordance with an exemplary embodiment of the invention. The substantial resolution improvement of the FIG. 3B image arises from utilization of information from all nine spectral bands.

Naturally, the multi-spectral full motion video sensor concept of operation can include spectral anomaly detection. Impact of demosaicking processing on such detection essentially defines the merit of the developed process. As a first order test, the standard spectral anomaly detection algorithm RX can be applied to a scene with the set of targets shown on FIGS. 3A and 3B. FIG. 3C is a chart of ROCs for RX anomaly detection algorithm using demosaicked (denoted as SR), interpolated, and raw spectral bands. Test ROCs obtained with demosaicked data 305 (i.e., the line that originates farthest to the left (i.e., fewest false alarms)), interpolated data 310 (i.e. the line that originates in the middle), and raw data without upsampling 315 (i.e., the line that originates farthest to the right) are displayed on FIG. 3C. The false alarm rate for early detection (which usually defines operational range) demonstrated by the demosaicked data can be about 10 times lower compared to the false alarm rate demonstrated by interpolated and raw data. This can be explained by greater uniformity of object and background spectra obtained with the exemplary demosaicking process.

Figure 4B:
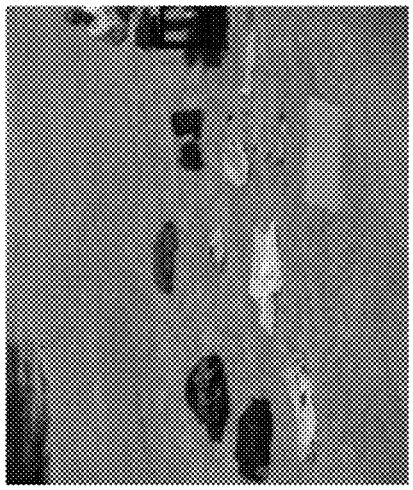
FIG. 4B is a RGB representation of nine bands that are linearly interpolated.
Figure 4A:
FIG. 4A is a RGB representation of nine bands that are pixel-stacked data as collected with 9-band mosaic-array camera.
Figure 4C:
FIG. 4C is a RGB representation of nine bands obtained with demosaicking process, in accordance with an exemplary embodiment of the invention.

One of ordinary skill in the art will understand that the black and white picture in the patent application does not fully capture the capabilities of the invention, but FIG. 3 is utilized for a discussion of the exemplary invention. Capabilities of the exemplary invention for the target set scene are demonstrated in FIG. 4. FIG. 4A is a RGB representation of nine bands pixel-stacked data as collected with 9-band mosaic-array camera. FIG. 4B is a RGB representation of nine bands obtained with band independent linear interpolation of the collected data. FIG. 4C is a RGB representation of nine bands obtained with demosaicking process, in accordance with an exemplary embodiment in the invention. Interpolation of the collected data provides smoothing to the image edges but does not improve the resolution, which can be observed by comparison of FIG. 4A to FIG. 4B. In contrast demosaicking, performed in accordance with an exemplary embodiment in the invention, produces significantly sharper image compared to both collected data and band independent interpolation. It is important to note that demosaicking, performed in accordance with an exemplary embodiment in the invention, preserves color discrimination of the objects placed in the scene.

In summary, a novel multi-spectral demosaicking process is described that takes advantage of a multi-band video rate sensor design based on spectral filtering. Capability of the developed process to enhance spatial resolution of the spectral bands can be demonstrated using video collected at a roof top experiment. The visual results and the results of the anomaly detection tests suggest that demosaicking processing provides significant resolution enhancement and reduction of false alarm rate for spectral anomaly detection compared to independent interpolation of spectral bands.

Portions of the invention can comprise a computer program that embodies the functions described herein. For example, the demosaicking computer system and processor can be programmable. Furthermore, any modules described herein, such as the clustering module, weights module, and super-resolution module, can be implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an exemplary embodiment based on the figures and associated description in the application text. Therefore, disclosure of a particular set of program code instructions is not considered necessary for an adequate understanding of how to make and use the invention.

It should be understood that the foregoing relates only to illustrative embodiments of the present invention, and that numerous changes may be made therein without departing from the scope and spirit of the invention as defined by the following claims.

The invention claimed is:

1. A computer-implemented demosaicking method, comprising the steps of:

receiving an image at a demosaicking processor, wherein the image comprises four or more band images that each correspond to an unique spectral band obtained by a multi-spectral band camera;

performing spectral clustering of the four or more band images to identify a plurality of clusters with a clustering module, wherein the clustering module is implemented in a computer system that comprises instructions stored in a machine-readable medium and a processor that executes the instructions;

for each of the plurality of clusters, determining a cluster weight by computing correlations between each of the unique spectral bands in each cluster with a weights module, wherein the weights module is implemented in a computer system that comprises instructions stored in a machine-readable medium and a processor that executes the instructions; and performing super-resolution for each of the unique spectral bands utilizing the cluster weights from the weights module with a super-resolution module, wherein super-resolution is applied iteratively for each of the unique spectral bands and a value for each unique spectral band is updated after each iteration, and wherein the super-resolution module is implemented in a computer system that comprises instructions stored in a machine-readable medium and a processor that executes the instructions.

2. The method of claim 1, further comprising the step of receiving a plurality of images at the demosaicking processor, wherein each of the plurality of images correspond to a video frame obtained by the multi-spectral band camera.

3. The method of claim 2, wherein the demosaicking method is applied to each video frame wherein the video frame comprises four or more band images that each correspond to an unique spectral band.

4. A demosaicking system, comprising:

a demosaicking processor configured to receive an image, wherein the image comprises four or more band images that each correspond to an unique spectral band;

a clustering module configured to perform spectral clustering of the four or more band images to identify a plurality of clusters, wherein the clustering module is implemented in a computer system that comprises instructions stored in a machine-readable medium and the demosaicking processor executes the instructions;

a weights module configured to determine a cluster weight by computing correlations between each of the unique spectral bands in each cluster with a weights module for each of the plurality of clusters, wherein the weights module is implemented in a computer system that comprises instructions stored in a machine-readable medium and the demosaicking processor executes the instructions; and a super-resolution module configured to perform super-resolution for each of the unique spectral bands utilizing the cluster weights from the weights module, and wherein the super-resolution module is configured to apply super-resolution iteratively for each of the unique spectral bands and a value for each unique spectral band is updated after each iteration, and wherein the super-resolution module is implemented in a computer system that comprises instructions stored in a machine-readable medium and the demosaicking processor executes the instructions.

5. The demosaicking system of claim 4, further comprising a multi-spectral band camera configured to obtain the image and send the image to the demosaicking processor.

6. The demosaicking system of claim 5, wherein the multi-spectral band camera is further configured to obtain video, wherein the video comprises a plurality of frames, and wherein each frame of the video corresponds to an image that can be sent to the demosaicking processor.

* * * * *